United States Patent

Morris

[15] 3,668,913

[45] June 13, 1972

[54] APPARATUS FOR SHOT-PEENING TURBINE BLADES

[72] Inventor: John W. Morris, Huntington Beach, Calif.

[73] Assignee: Metal Improvement Company, Inc.

[22] Filed: Oct. 5, 1970

[21] Appl. No.: 77,845

[52] U.S. Cl. ........................................72/53, 72/419, 269/57
[51] Int. Cl. ............................................................C21d 7/06
[58] Field of Search ............................72/53, 419, 420; 51/15; 269/57

[56] References Cited

UNITED STATES PATENTS 3,270,464  9/1966  Bowling.......................................51/15
3,438,229  4/1969  Bartlett.......................................72/53

Primary Examiner—Charles W. Lanham
Assistant Examiner—Gene P. Crosby
Attorney—Raymond P. Wallace and Victor D. Behn

[57] ABSTRACT

A turntable having a number of pairs of apposed resilient gripping members mounted on nested ring members, one of the rings having its axis eccentrically translatable relative to the other, the translatable ring being pressure-biased in one direction transversely to its axis so that the space between the rings is greater at one end of a diameter to allow loading of workpieces between gripping members, the space closing with rotation of the rings to provide a firm grip of the workpieces passing through a subsequent peening zone, a portion of each workpiece being exposed to peening action and a portion shielded therefrom.

7 Claims, 3 Drawing Figures

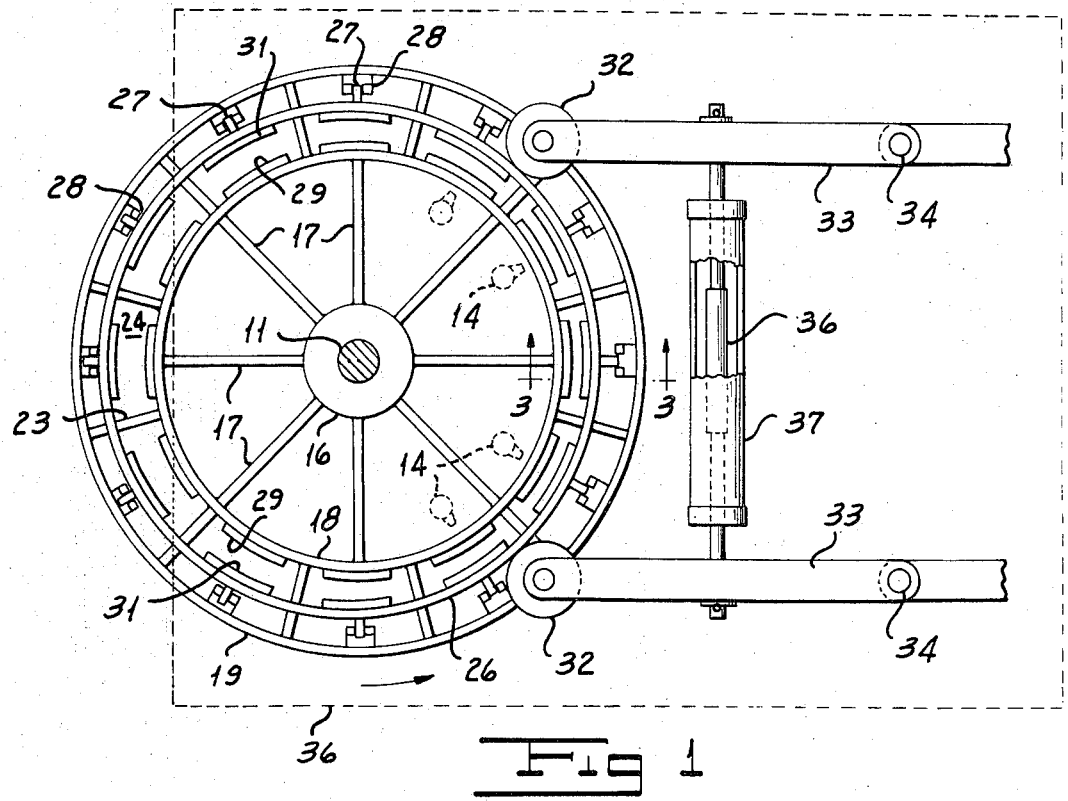
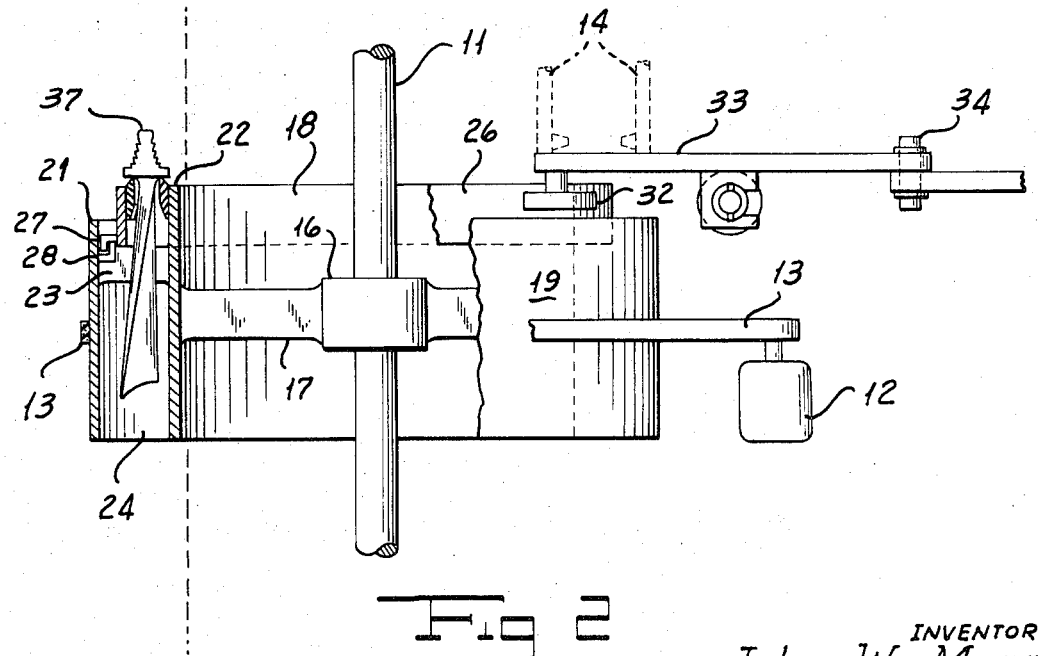

3,668,913

APPARATUS FOR SHOT-PEENING TURBINE BLADES

BACKGROUND OF THE INVENTION

This invention relates to apparatus for shot-peening portions of a workpiece while shielding other portions, and more particularly to such apparatus wherein the airfoil portion of a turbine blade is masked from the peening operation while the root portion is being peened.

In the prior art it is known to provide a turntable having a plurality of apertures therein, in each of which apertures is disposed a rubber cylinder having a socket therein of airfoil configuration, of a size and shape to accept the airfoil section of the blade to be peened. An operator at one side of the turntable thrusts a blade into each socket, leaving the root portion exposed. The turntable, rotating either intermittently or continuously, then carries the blade through a flexible curtain into a cabinet where appropriate nozzles direct metal shot or glass beads or other peening material against the exposed root portion.

Such an arrangement requires expensive tooling, in that each rubber cylinder must be molded with a blade socket of the correct size and shape for the blade being peened. If blades of another size or shape are to be processed, another set of cylinders must be provided. Furthermore, since turbine blades have a twist in the airfoil portion, the sockets in the cylinders must have a corresponding twist, and the blades must be inserted by the operator with a twisting motion. This makes for slow loading of the cylinders and a low production rate, since the blade must be pushed fully into the socket in order to leave no portion of the airfoil section exposed to the peening material.

SUMMARY OF THE INVENTION

The present invention provides a turntable having as portions thereof two ring members one inside the other, the rings bearing on their apposed surfaces a plurality of pairs of circumferentially disposed gripping members of rubber or other resilient material. One of the rings has its center of the turntable axis and is fixed to the turntable for rotation therewith. The other ring is keyed to the turntable so that it rotates therewith, but in such a manner that it is to some degree slidable across the diameter of the turntable, and therefore its axis of rotation is somewhat displaced from the axis of the other ring. Biasing means is provided so that the slidable ring is constantly biased toward one side of the turntable. Thus, as the mechanism turns, the spacing between the ring members and their paired gripping members is always greater on one side of the turntable, which is the loading station. At the loading station blades are inserted with the airfoil section between the gripping members, the space therebetween being sufficient for insertion without great effort or severe friction. The roots of the blades protrude above the gripping members for exposure to peening, and the airfoil sections are shielded from the peening material between the rings. As the apparatus turns, with one ring constantly biased off center, the space therebetween narrows and grips the blades firmly between the resilient members as the blades enter the peening cabinet through the flexible curtain. As the rings rotate through the peening section, the blade roots remain above the gripping members and are exposed to the peening process, and the airfoil portions between the rings are shielded from stray peening material.

Since the gripping members are elements of simple form, the cylinders of the prior art having precisely shaped sockets are no longer necessary, and the cost of the tooling is greatly reduced. Since the machine can be easily loaded with a simple thrust of the blade, operation is much more rapid. In continuous operation, for example, there are no longer any empty positions which might formerly result because the operator could not get the blade inserted into the socketed cylinder during the time it was exposed to him. Further, the gripping members will accept blades of a considerable range of sizes and curvatures, so that it is no longer necessary to have a separate set of tooling for every different size or pattern of blades. Items other than turbine blades can also be peened in such equipment, and in some cases even with the same tooling rings, where the workpieces have sections suitable for gripping between the rings.

It is therefore an object of this invention to provide apparatus for holding workpieces during a peening operation.

It is another object to provide apparatus for passing turbine blades through a peening zone, masking the airfoil portions while exposing the root portions to peening action.

Other objects and advantages will become apparent on reading the following specification in conjunction with the accompanying drawings.

BRIEF DESCRIPTION OF THE DRAWINGS

FIG. 1 is a semischematic plan view of a device according to the invention;

FIG. 2 is an elevation partly in cross-section of the showing of FIG. 1; and

DESCRIPTION OF THE PREFERRED EMBODIMENT

Figure 3:
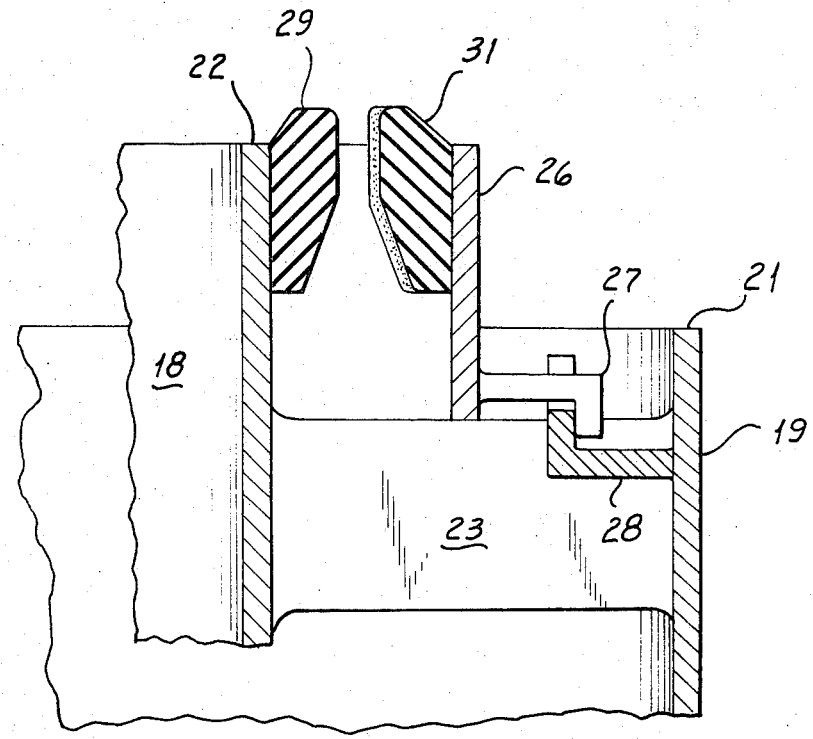
FIG. 3 is an enlarged fragmentary cross-section taken on line 3—3 of FIG. 1.

In FIGS. 1 and 2 there is shown an illustration of the device of the invention, with some of the proportions and the amount of relative displacement of the rings exaggerated for clarity of illustration. There is shown a vertical shaft 11 journaled in appropriate bearings (not shown). The drive means may be a motor 12 drivingly connected to the outer ring by a belt 13, or the motor may be connected to the shaft 11 by gearing or other suitable arrangement. There may also be provided means for intermittent stop-motion so that blades may pause briefly in line with the peening nozzles, shown schematically at 14.

The shaft 11 has mounted thereon a hub 16 having ribs or spokes 17 extending radially therefrom and supporting a barrel 18, coaxial with the shaft and rotatable therewith. Surrounding barrel 18 and coaxial therewith is a larger barrel 19, having its top edge 21 somewhat lower than the top edge 22 of barrel 18. Barrel 19 is supported by ribs 23 extending radially from the exterior surface of barrel 18, providing an annular space 24 between the two barrels.

The top edges of ribs 23 are disposed in a plane on which rests a ring 26 of a diameter intermediate between those of the two barrels, and extending upwardly to a level with the upper edge 22 of barrel 18. The ring 26 is keyed to the outer barrel by a plurality of fingers 27 (best shown in FIG. 3) extending radially outwardly from the circumference of the barrel, and resting in clevis members or yokes 28 extending radially inwardly from the outer barrel 19. This arrangement leaves ring 26 free to slide back and forth across ribs 23, but keyed to the turntable for rotation therewith. Other means of supporting ring 26 may be satisfactory if it is desired to otherwise position ribs 23. For instance, the ring may be supported wholly by fingers 27 in the yokes 28. It will also be understood that the fingers and yokes may take forms somewhat different from those shown; the yokes may be individual members, or may be a circular channel with slots cut in the vertical web for the fingers, or the fingers may extend through holes in barrel 19.

The outer circumference of barrel 18 has a plurality of cushion gripping members 29 positioned thereon near the top and projecting slightly above the top edge 22 (best shown in FIG. 3). The gripping members may be formed of rubber or other suitable resilient material. The inner surface of ring 26 has an equal number of similar gripping members 31, paired with those of barrel 18 in opposed relationship.

Ring 26 is constantly biased toward one side of the turntable by the pressure of a pair of rollers 32 which idle against the exterior surface of the ring. Each roller is mounted on an arm 33 having a swivel joint 34. Pressure is applied to the rollers by pulling the arms together with a turnbuckle 36, which is protected against damage by stray peening material by being enclosed within a tube, pipe, or other suitable housing 37.

Pulling the adjustable arms together with the turnbuckle causes the rollers 32 to bear harder against ring 26, thrusting it further off center, whereas loosening the turnbuckle allows the arms to separate and the pressure to relax. The turnbuckle assembly is held to the adjustable arms 33 by seating its ends in clips 34 or other suitable detents attached to the arms, and is demountable therefrom when it is desired to swing the rollers free of engagement with the ring 26.

The larger part of the turntable is enclosed within a peening cabinet formed of a flexible curtain, indicated schematically by the dashed line 36. Such cabinets are known in the art, and may be formed of rubber, plastic, or the like. At the points where the turntable enters and emerges from the cabinet the curtain is formed into a plurality of flexible fingers or strips which are resiliently brushed aside by the moving equipment.

The slidable ring member 26 is normally biased toward the side of the turntable which protrudes outside the peening cabinet, at the left side of the illustration in FIG. 1. The spacing between the members 29 and 31 of each pair of grips is therefore greatest at that point, which is the loading station. A workpiece 37, such as a turbine blade (as shown in FIG. 2) is thrust by the operator into the space between a pair of grips, which lightly engage the workpiece. The portion of the workpiece to be peened remains exposed above the turntable, and the portion to be shielded extends into the annular space 24 between the two barrels where peening material will not reach it. As the turntable rotates, the space between gripping members 29 and 31 diminishes, holding the workpiece firmly. The portion to be peened, such as the root portion of a turbine blade, traverses the peening zone past appropriately disposed and oriented peening nozzles 14. When the treated workpiece reappears through the flexible curtain, the holding pressure of the gripping members has again relaxed, the operator removes the workpiece and inserts another. The speed of the turntable is governed to the desired length of peening time, having regard to the number of peening nozzles to which the part will be exposed. If desired, the turntable may be operated with an intermittent stop-motion, so that each workpiece has a dwell time before one or more peening nozzles. The amount of relative movement shown between the movable ring and its related barrel has been much exaggerated in the drawing for clarity of illustration. In actual operation, the spacing at the loading station is such as to allow ready insertion or removal of a part, and at the opposite diameter, inside the peening cabinet, the part is firmly held without undue distortion of the gripping members. It is possible to pressure bias the slidable ring in the opposite direction, in which case the gripping members are mounted on the outside of the ring and paired with similar gripping members on the inside of the outer barrel.

It will be apparent from the foregoing description that apparatus of the type set forth is suitable for peening portions of workpieces of various kinds and shapes, and that within reasonable limits workpieces of different sizes may be peened without a change of tooling.

What is claimed is:

1. Apparatus for shot-peening workpieces, comprising in combination a turntable having an outer barrel rotatable on a vertical axis, an inner barrel coaxial and rotatable therewith, the two barrels defining an annular space therebetween, a ring member disposed between the two barrels and having an axis parallel to but displaced from the barrel axis, the ring being rotatable on its own axis and keyed to one of the barrels for rotation thereby, a plurality of pairs of opposed gripping members mounted respectively on the ring and one of the barrels, each pair of gripping members being adapted to hold a workpiece therebetween, one side of the turntable comprising a loading station where the spacing between members of a pair of gripping members is greatest to allow positioning of a workpiece therebetween, such spacing progressively diminishing with rotation of the turntable to the side diametrally opposite.

2. The combination recited in claim 1, wherein at least one shot-peening nozzle is disposed at a position circumferentially removed from the loading station, and the workpieces are rotated through the discharge zone of the nozzle.

3. The combination recited in claim 2, wherein the axis of the ring member is maintained displaced toward the loading station by pressure against the ring from the direction opposite the loading station.

4. The combination recited in claim 3, wherein the pressure is adjustably applied by a pair of idler rollers bearing against the ring, each of the rollers being mounted on a pivotable arm extending toward the ring, the arms being connected by extensible means to govern the spacing therebetween and thereby vary the pressure of the rollers against the ring.

5. The combination recited in claim 4, wherein the gripping members are formed of resilient material, the mating members of each pair being mounted respectively on the outer circumference of the inner barrel and on the inner circumference of the ring.

6. The combination recited in claim 5, wherein the gripping members are positioned at the top of the turntable to hold a workpiece with the portion to be shot-peened protruding above the gripping members and the remainder of the workpiece disposed in the annular space between the barrels and shielded by the barrels from peening material.

7. The combination recited in claim 4, wherein yoke members extend radially inwardly from the wall of the outer barrel, and fingers extend radially outwardly from the ring, the fingers being slidably positioned in the yoke members to key the ring to the outer barrel for rotation thereby.

* * * * *